(12) United States Patent
Ohnishi

(10) Patent No.: US 9,346,249 B2
(45) Date of Patent: May 24, 2016

(54) FASTENER MATERIAL ADVANCING DIRECTION CHANGING APPARATUS

(71) Applicant: Totani Corporation, Kyoto (JP)

(72) Inventor: Yuji Ohnishi, Kyoto (JP)

(73) Assignee: Totani Corporation, Kyoto (JP)

( * ) Notice: Subject to any disclaimer, the term of this patent is extended or adjusted under 35 U.S.C. 154(b) by 86 days.

(21) Appl. No.: 14/321,851

(22) Filed: Jul. 2, 2014

(65) Prior Publication Data

US 2015/0013915 A1    Jan. 15, 2015

(30) Foreign Application Priority Data

Jul. 10, 2013   (JP) .................................. 2013-144420

(51) Int. Cl.
| | |
|---|---|
| *B31B 19/90* | (2006.01) |
| *B32B 37/00* | (2006.01) |
| *B31B 1/00* | (2006.01) |
| *B32B 37/20* | (2006.01) |
| *B32B 38/18* | (2006.01) |
| *B65H 20/02* | (2006.01) |

(52) U.S. Cl.
CPC ............... *B32B 37/0053* (2013.01); *B31B 1/00* (2013.01); *B31B 19/90* (2013.01); *B32B 37/20* (2013.01); *B32B 38/1841* (2013.01); *B65H 20/02* (2013.01); *B31B 2219/9019* (2013.01); *B32B 2305/38* (2013.01); *B32B 2309/06* (2013.01)

(58) Field of Classification Search
None
See application file for complete search history.

(56) References Cited

U.S. PATENT DOCUMENTS

| | | | | |
|---|---|---|---|---|
| 4,790,126 A | * | 12/1988 | Boeckmann | .......... B29C 66/344 |
| | | | | 226/196.1 |
| 4,969,967 A | * | 11/1990 | Sorensen | ................ B31B 19/90 |
| | | | | 156/244.25 |
| 5,425,216 A | | 6/1995 | Ausnit | |
| 6,477,820 B1 | | 11/2002 | Dutra et al. | |
| 7,331,917 B2 | | 2/2008 | Totani | |
| 2006/0045393 A1 | * | 3/2006 | Daniels | ................... B31B 19/36 |
| | | | | 383/120 |

FOREIGN PATENT DOCUMENTS

| | | |
|---|---|---|
| WO | 0027721 | 5/2000 |
| WO | 0214154 | 2/2002 |

* cited by examiner

*Primary Examiner* — Barbara J Musser
(74) *Attorney, Agent, or Firm* — Kirschstein, Israel, Schiffmiller & Pieroni, P.C.

(57) ABSTRACT

First and second bodies of fastener material 4 and 5 advance in a first direction which is an advancing direction, the advancing direction being changed into a second direction. A pair of turn over bars 12 and 13 are spaced from each other, the first and second bodies of fastener material 4 and 5 advancing in the first direction to be engaged with the turn over bars 12 and 13. The first and second bodies of fastener material 4 and 5 are then inserted between and turned over by the turn over bars 12 and 13 with the advancing direction being changed into the second direction.

8 Claims, 3 Drawing Sheets

A

B

A

B

FASTENER MATERIAL ADVANCING DIRECTION CHANGING APPARATUS

TECHNICAL FIELD

The invention relates to a fastener material advancing direction changing apparatus by which an advancing direction is changed for first and second bodies of fastener material.

BACKGROUND

For example, WO 00/27721 discloses a plastic bag including a panel portion and a fastener portion. The panel portion is formed of first and second webs of panel material superposed with each other. The fastener portion is formed of first and second bodies of fastener material to extend along the top edge of the plastic bag. The first web of panel material and the first body of fastener material are joined to each other while the second web of panel material and the second body of fastener material are joined to each other within the plastic bag. The first and second bodies of fastener material are meshing engaged with each other so that the plastic bag can be closed by the first and second bodies of fastener material. The fastener portion comprises a hook and loop fastener portion. The plastic bag would be used for various purposes to be high in utility, regardless of a problem of airtightness of hook and loop fastener portion.

On the other hand, U.S. Pat. No. 7,331,917 discloses a machine for successively making plastic bags in which first and second webs of panel material are superposed with each other and fed longitudinally thereof. The machine includes longitudinal and cross seal devices by which the first and second webs of panel material are heat sealed with each other longitudinally and widthwise thereof. The first and second webs of panel material are then cross cut widthwise thereof by a cutter. The machine is efficient and effective. It can successively make plastic bags at high speed, resulting in high performance.

It is therefore required to successively make plastic bags in the form of the machine of U.S. Pat. No. 7,331,917, each of the plastic bags including a fastener portion so that the plastic bag can be closed by first and second bodies of fastener material as in the case of the plastic bag of WO 00/27721. In order to fulfill the requirement, the first and second bodies of fastener material have to extend in a direction of length of webs of panel material between the first and second webs of panel material. In addition, it is preferable that in the first place, the first and second bodies of fastener material advance in a direction of width of webs of panel material which is an advancing direction, to be inserted between the first and second webs of panel material. The advancing direction should then be changed into the direction of length of webs of panel material between the first and second webs of panel material.

It is therefore an object of the invention to provide a fastener material advancing direction changing apparatus in which first and second bodies of fastener material advance in a first direction which is an advancing direction, the advancing direction being then changed into a second direction.

SUMMARY OF THE INVENTION

According to the invention, the apparatus comprises a pair of turn over bars spaced from each other in a third direction normal to the first and second directions and inclined at a predetermined angle with respect to the first direction. The apparatus further comprises a guide device by which the first and second bodies of fastener material are guided to advance in the first direction to be directed to and engaged with the turn over bars. The first and second bodies of fastener material are then inserted between and turned over by the turn over bars with the advancing direction being changed into the second direction so that the first and second bodies of fastener material should advance in the second direction in a state of being opposed to each other. The first and second bodies of fastener material are disposed in plane with each other when advancing in the first and second directions.

In a preferred embodiment, the turn over bars are inclined at an angle of 45° with respect to the first direction while the second direction is inclined at an angle of 45° with respect to the turn over bars so that the advancing direction should be changed at an angle of 90°.

The apparatus further comprises a meshing engagement device disposed downstream of the turn over bars in the second direction. The first and second bodies of fastener material advance in the second direction to pass through the meshing engagement device so that the first and second bodies of fastener material should be meshing engaged with each other by the meshing engagement device.

The first and second bodies of fastener material may be meshing engaged with each other by the turn over bars when being inserted between the turn over bars.

The first and second bodies of fastener material include meshing engagement portions formed integrally with tapes. The meshing engagement portions are opposed to each other in the first and second bodies of fastener material when advancing in the second direction.

The guide device includes first, second and third guide portions. The first and second guide portions are disposed upstream of the turn over bars in the first direction. The first and second guide portions include first and second grooves formed therein. The first body of fastener material is inserted into the first guide groove for guidance of the meshing engagement portion and the tape. The second body of fastener material is inserted into the second guide groove for guidance of the meshing engagement portion and the tape. The third guide portion is disposed downstream of the turn over bars in the second direction. The third guide portion includes a third guide groove formed therein. The first and second bodies of fastener material are inserted into the third guide groove for guidance of the meshing engagement portions and the tapes. The third guide portion further includes a pair of plates inserted between the tapes of the first and second bodies of fastener material on opposite sides of the meshing engagement portions when the first and second bodies of fastener material are inserted into the third guide groove.

The turn over bars are disposed parallel to each other. The first and second bodies of fastener material advance in the first direction to be directed to the turn over bars on one side of the turn over bars in a state of being opposed to each other.

The turn over bars may intersect with each other. The first and second bodies of fastener material advance in the first direction to be directed to the turn over bars on opposite sides of the turn over bars.

BEST MODE TO CARRY OUT THE INVENTION

Figure 1:
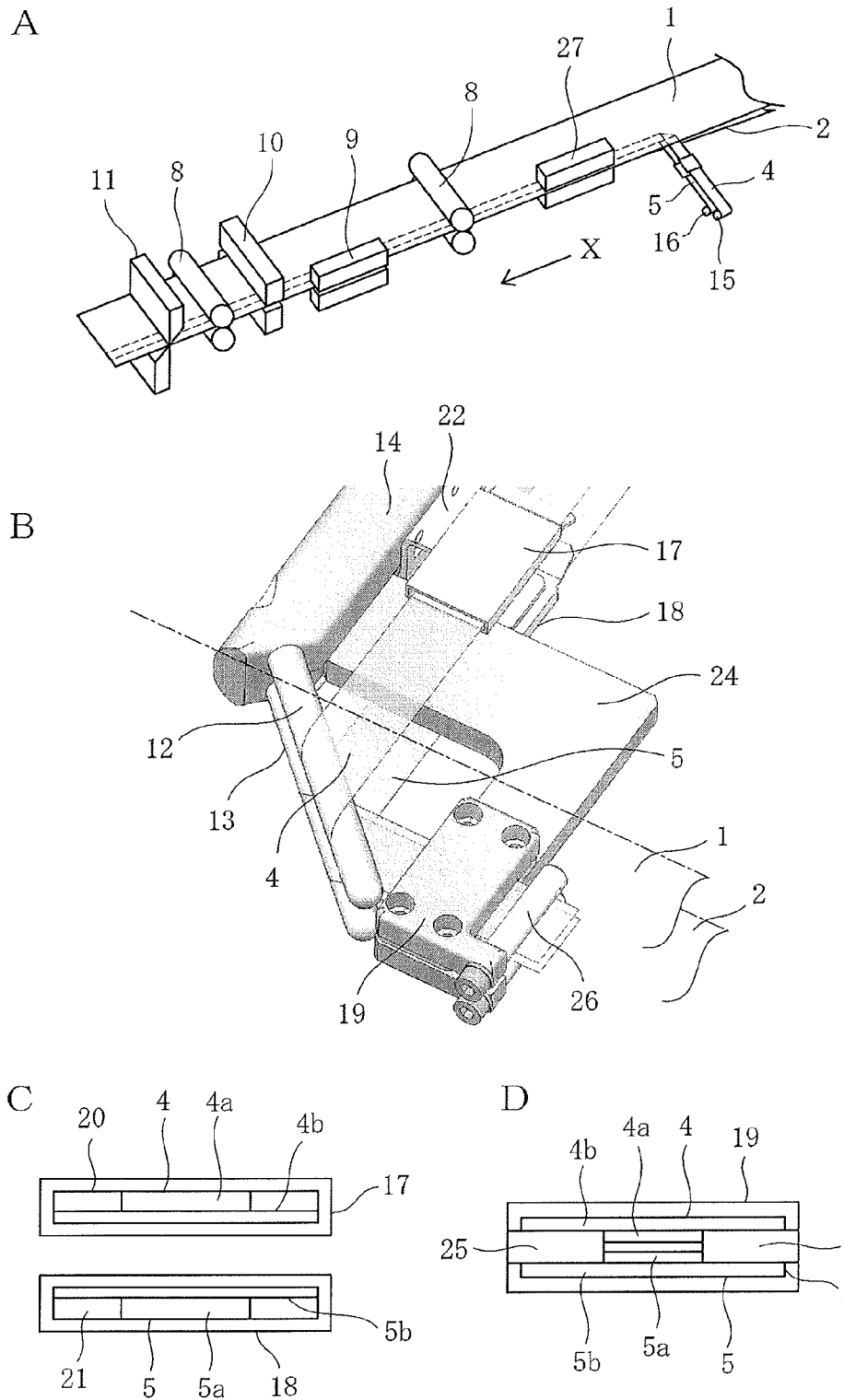
FIG. 1 is a perspective view (A) of a preferred embodiment of the invention, a perspective view (B) of the apparatus of (A), a sectional view (C) of the first and second guide portions of (B) and a sectional view (D) of the third guide portion of (B).
Figure 2:
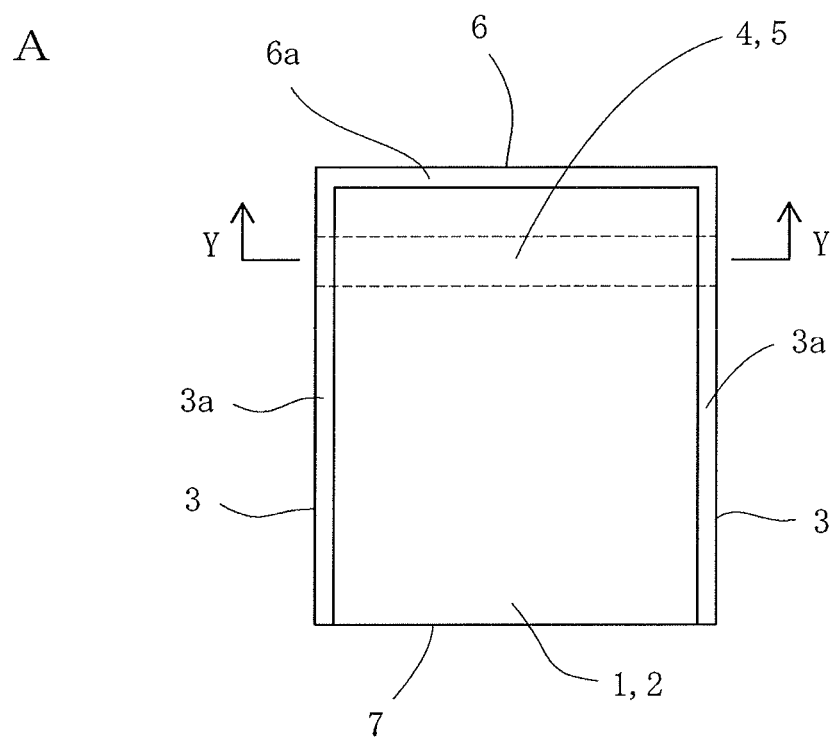
FIG. 2 is an explanatory view (A) of the plastic bag obtained by the machine of FIG. 1 and a sectional view (B) taken along the line Y-Y of (A).
Figure 2:
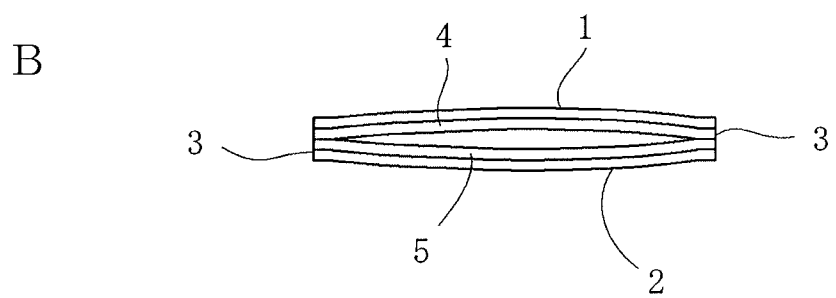

Turning now to the drawings, FIG. 1 illustrates a machine for successively making plastic bags of FIG. 2, according to the invention.

The plastic bag includes a panel portion and a fastener portion, as in the case of the plastic bag of WO 00/27721. The panel portion is formed of first and second webs of panel material 1 and 2 superposed with each other, as shown in FIG. 2. The first and second webs of panel material 1 and 2 are heat sealed with each other along the opposite side edges 3 thereof so that heat seal portions 3a should be formed along the opposite side edges 3. The fastener portion is formed of first and second bodies of fastener material 4 and 5 to extend along the top edge 6 of the plastic bag. The first web of panel material 1 and the first body of fastener material 4 are joined to each other while the second web of panel material 2 and the second body of fastener material 5 are joined to each other within the plastic bag. In addition, the first and second webs of panel material 1 and 2 are heat sealed with each other along the top edge 6 thereof so that a heat seal portion 6a should be formed along the top edge 6.

The plastic bag is filled with content at the bottom edge 7 thereof, after making the plastic bag. The first and second webs of panel material 1 and 2 are then heat sealed with each other along the bottom edge 7. It is therefore understood that the plastic bag is torn off and opened along the top edge 6 thereof after being filled with the content so that the content can be discharged from the plastic bag. The first and second bodies of fastener material 4 and 5 are then meshing engaged with each other so that the plastic bag can be closed by the first and second bodies of fastener material 4 and 5.

In order to successively make the plastic bags of FIG. 2, in the machine of FIG. 1, the first and second webs of panel material 1 and 2 are superposed with each other and fed longitudinally thereof. The first and second webs of panel material 1 and 2 are disposed and fed horizontally. In the embodiment, the machine includes a feeding device comprising rollers 8 to which the first and second webs of panel material 1 and 2 are directed. The rollers 8 are rotated intermittently by a motor so that the first and second webs of panel material 1 and 2 should be fed intermittently. The first web of panel material 1 is an upper web of panel material comprising a plastic film while the second web of panel material 2 is a lower web of panel material comprising a plastic film. The feeding direction X is predetermined longitudinally of the webs of panel material 1 and 2.

In addition, the first and second webs of panel material 1 and 2 are heat sealed with each other longitudinally thereof by a longitudinal seal device when being stopped temporarily whenever being fed intermittently. The longitudinal seal device includes a pair of seal bars 9 extending longitudinally of the webs of panel material 1 and 2 and disposed on opposite sides thereof. The first and second webs of panel material 1 and 2 are sandwiched between and heated by the seal bars 9 when being stopped temporarily to be heat sealed with each other, the heat seal portion 6a of FIG. 2 being thereby formed.

The first and second webs of panel material 1 and 2 are heat sealed with each other widthwise thereof by a cross seal device when being temporarily stopped whenever being fed intermittently. The cross seal device includes a pair of seal bars 10 extending widthwise of the webs of panel material 1 and 2 and disposed on opposite sides thereof. The first and second webs of panel material 1 and 2 are sandwiched between and heated by the seal bars 10 when being stopped temporarily to be heat sealed with each other, the heat seal portion 3a of FIG. 2 being thereby formed.

The first and second webs of panel material 1 and 2 are then cross cut widthwise thereof by a cutter 11 when being temporarily stopped whenever being fed intermittently, the opposite side edges 3 of FIG. 2 being thereby formed. The top and bottom edges 6 and 7 of FIG. 2 are formed by the opposite side edges of the first and second webs of panel material 1 and 2.

Furthermore, first and second bodies of fastener material 4 and 5 are used in the machine to successively make plastic bags. In this connection, a fastener material advancing direction changing apparatus is incorporated into the machine so that an advancing direction should be changed for the first and second bodies of fastener material 4 and 5. The first and second bodies of fastener material 4 and 5 advance in a first direction which is the advancing direction, the advancing direction being then changed into a second direction. The first and second bodies of fastener material 4 and 5 then advance in the second direction in a state of being opposed to each other. The first direction is a direction of width of webs of panel material 1 and 2, the first and second bodies of fastener material 4 and 5 extending and advancing in the direction of width of webs of panel material 1 and 2 to be inserted between the first and second webs of panel material 1 and 2. The second direction is a direction of length of webs of panel material 1 and 2. The advancing direction is therefore changed into the direction of length of webs of panel material 1 and 2 between the first and second webs of panel material 1 and 2 after the bodies of fastener material 4 and 5 are inserted. The first and second bodies of fastener material 4 and 5 then extend and advance in the direction of length of webs of panel material 1 in the state of being opposed to each other between the first and second webs of panel material 1 and 2. The fastener portion is formed of the first and second bodies of fastener material 4 and 5, comprising a hook and loop fastener portion, as in the case of the plastic bag of WO 00/27721.

The apparatus includes a pair of turn over bars 12 and 13 spaced from each other in a third direction normal to the first and second directions and inclined at a predetermined angle with respect to the first direction. In the embodiment, the first and second directions are the directions of width and length of webs of panel material 1 and 2 which are horizontal. The third direction is therefore vertical, the turn over bars 12 and 13 being spaced from each other vertically. The turn over bar 12 is an upper bar while the turn over bar 13 is a lower bar. The turn over bars 12 and 13 are mounted on and supported by a bracket 14 to be disposed between the first and second webs of panel material 1 and 2. The turn over bars 12 and 13 extend horizontally to be inclined at a predetermined angle with respect to the direction of width of webs of panel material 1 and 2.

The apparatus further includes a guide device by which the first and second bodies of fastener material 4 and 5 are guided to extend and advance in the first direction which is the direction of width of webs of panel material 1 and 2. The first and second bodies of fastener material 4 and 5 is then inserted between the webs of panel material 1 and 2 to be directed to and engaged with the turn over bars 12 and 13. The first body of fastener material 4 is engaged with the turn over bar 12 on upper side thereof while the second body of fastener material 5 is engaged with the turn over bar 13 on lower side thereof. The first and second bodies of fastener material 4 and 5 are then inserted between and turned over by the turn over bars 12 and 13 with the advancing direction being changed into the second direction so that the first and second bodies of fastener material 4 and 5 should extend and advance in the second direction in the state of being opposed to each other.

In the embodiment, the turn over bars 12 and 13 are inclined at an angle of 45° with respect to the first direction while the second direction is inclined at an angle of 45° with respect to the turn over bars 12 and 13 so that the advancing direction should be changed at an angle of 90°. It should therefore be understood that the first and second bodies of fastener material 4 and 5 advance in the direction of width of webs of panel material 1 and 2 which is the advancing direction, the advancing direction being then changed into the direction of length of webs of panel material 1 and 2.

In the embodiment, the turn over bars 12 and 13 are disposed parallel to each other. The first and second bodies of fastener material 4 and 5 advance in the first direction to be directed to the turn over bars 12 and 13 on one side of the turn over bars 12 and 13 in the state of being opposed to each other. For example, first and second bobbins 15 and 16 are disposed on one side of the turn over bars 12 and 13 in the direction of width of webs of panel material 1 and 2. The first and second bobbins 15 and 16 are spaced from each other so that the first and second bodies of fastener material 4 and 5 should advance in the direction of width of webs of panel material 1 and 2 from the bobbins 15 and 16 to be directed to the turn over bars 12 and 13 in the state of being opposed to each other.

The first and second bodies of fastener material 4 and 5 include meshing engagement portions 4a and 5a formed integrally with tapes 4b and 5b. The meshing engagement portions 4a and 5a are opposed to each other in the first and second bodies of fastener material 4 and 5 when advancing in the second direction which is the direction of length of webs of panel material 1 and 2. It should therefore be understood that the first and second bodies of fastener material 4 and 5 can be meshing engaged with each other.

The guide device includes first, second and third guide portions 17, 18 and 19. The first and second guide portions 17 and 18 are disposed upstream of the turn over bars 12 and 13 in the first direction. The first and second guide portions 17 and 18 include first and second guide grooves 20 and 21 formed therein. The first and second guide portions 17 and 18 are tunnel shaped and mounted on and supported by a bracket 22. The first guide groove 20 comprises a rectangular aperture, the first body of fastener material 4 being inserted into the first guide groove 20 for guidance of the meshing engagement portion 4a and the tape 4b. The second guide groove 21 also comprises a rectangular aperture, the second body of fastener material 5 being inserted into the second guide groove 21 for guidance of the meshing engagement portion 5a and the tape 5b.

In the apparatus, not the meshing engagement portions 4a and 5a but the tapes 4b and 5b are opposed to each other in the first and second bodies of fastener material 4 and 5 when the first and second bodies of fastener material 4 and 5 advance in the first direction to be inserted into the first and second guide grooves 20 and 21. The first and second bodies of fastener material 4 and 5 are then turned over by the turn over bars 12 and 13 with the advancing direction being changed into the second direction. It should therefore be understood that the meshing engagement portions 4a and 5a are opposed to each other when the first and second bodies of fastener material 4 and 5 advance in the second direction.

The third guide portion 19 is disposed downstream of the turn over bars 12 and 13 in the second direction. The third guide portion 19 includes a third guide groove 23 formed therein. The third guide portion 19 is also tunnel shaped and mounted on and supported by a bracket 24 to be disposed between the first and second webs of panel material 1 and 2. The bracket 24 passes between the first and second bodies of fastener material 4 and 5 to be mounted on and supported by the bracket 14 at a position between the turn over bars 12 and 13 and the first and second guide portions 17 and 18. The third guide groove 23 comprises a rectangular aperture, the first and second bodies of fastener material 4 and 5 being inserted into the third groove 23 for guidance of the meshing engagement portions 4a and 5a and the tapes 4b and 5b. The third guide portion 19 further includes a pair of plates 25 inserted between the tapes 4b and 5b of the first and second bodies of fastener material 4 and 5 on opposite sides of the meshing engagement portions 4a and 5a when the first and second bodies of fastener material 4 and 5 are inserted into the third guide groove 23.

A meshing engagement device is disposed downstream of the turn over bars 12 and 13 in the second direction. The first and second bodies of fastener material 4 and 5 advance in the second direction to pass through the meshing engagement device so that the first and second bodies of fastener material 4 and 5 should be meshing engaged with each other by the meshing engagement device. The meshing engagement device comprises a pair of guide bars 26 mounted on and supported by the third guide portion 19. The guide bars 26 are disposed downstream of the third guide portion 19 and spaced from each other at a distance less than the distance between the turn over bars 12 and 13. The first and second bodies of fastener material 4 and 5 are inserted between the guide bars 26 so that the first and second bodies of fastener material 4 and 5 should get close to each other to be meshing engaged with each other.

The turn over bars 12 and 13 may be spaced from each other at a distance corresponding to or less than the sum of thicknesses of the first and second bodies of fastener material 4 and 5 so that the first and second bodies of fastener material 4 and 5 should be meshing engaged with each other by the turn over bars 12 and 13 when being inserted between the turn over bars 12 and 13. In this case, the guide bars 26 have not to be disposed downstream of the turn over bars 12 and 13.

In the embodiment, the first and second webs of panel material 1 and 2 are disposed and fed horizontally. The first and second bodies of fastener material 4 and 5 are also disposed horizontally to advance horizontally when advancing in the direction of width of webs of panel material 1 and 2. The first and second bodies of fastener material 4 and 5 are then turned over by the turn over bars 12 and 13 with the advancing direction being changed into the direction of length of webs of panel material 1 and 2 so that the first and second bodies of fastener material 4 and 5 should advance in the direction of length of webs of panel material 1 and 2. In this connection, it should be understood that the first and second bodies of fastener material 4 and 5 are disposed horizontally to advance horizontally when advancing in the direction of length of webs of panel material 1 and 2. The first and second bodies of fastener material 4 and 5 are therefore disposed in plane with each other when advancing in the first and second directions. The plane is horizontal.

The apparatus further includes a fastener material joining device for the first and second bodies of fastener material 4 and 5. The fastener material joining device comprises a fastener material heat seal device disposed downstream of the turn over bars 12 and 13, the third guide portion 19 and the guide bars 26 in the direction of length of webs of panel material 1 and 2. The fastener material heat seal device includes a pair of seal bars 27 extending longitudinally of the webs of panel material 1 and 2 and disposed on opposite sides thereof. The webs of panel material 1 and 2 and the bodies of fastener material 4 and 5 are sandwiched between and heated by the seal bars 27 when the webs of panel material 1 and 2 are stopped temporarily whenever being fed intermittently so that the first web of panel material 1 and the first body of fastener material 4 should be heat sealed with each other to be joined to each other, the second web of panel material 2 and the second body of fastener material 5 being heat sealed with each other to be joined to each other. The first and second bodies of fastener material 4 and 5 are then pulled to advance by the first and second webs of panel material 1 and 2 when the first and second webs of panel material 1 and 2 are fed intermittently.

The first and second webs of panel material 1 and 2 are then heat sealed with each other by the longitudinal and cross seal devices. Subsequently, the first and second webs of panel material 1 and 2 are cross cut by the cutter 11. The first and second bodies of fastener material 4 and 5 are also cross cut by the cutter 11.

The machine can therefore successively make the plastic bags of FIG. 2. The plastic bag includes the panel portion formed by the first and second webs of panel material 1 and 2 and the fastener portion formed by the first and second bodies of fastener material 4 and 5. The first and second bodies of fastener material 4 and 5 are meshing engaged with each other so that the plastic bag can be closed by the first and second bodies of fastener material 4 and 5, as in the case of the plastic bag of WO 00/27721. The plastic bag is used for various purposes to be high in utility.

In addition, in the machine, the first and second webs of panel material 1 and 2 are superposed with each other and fed longitudinally thereof. The first and second webs of panel material 1 and 2 are heat sealed with each other longitudinally and widthwise thereof by the longitudinal and cross seal devices. The first and second webs of panel material 1 and 2 are then cross cut widthwise thereof by the cutter 11, as in the case of the machine of U.S. Pat. No. 7,331,917. The machine can therefore successively make the plastic bags, to be efficient and effective. It can successively make the plastic bags at high speed, resulting in high performance.

In the apparatus, the first and second bodies of fastener material 4 and 5 are turned over by the turn over bars 12 and 13 with the advancing direction being changed. The first and second bodies of fastener material 4 and 5 are then opposed to each other and meshing engaged with each other. The first and second bodies of fastener material 4 and 5 are therefore turned over individually from each other with the advancing direction being changed, before the first and second bodies of fastener material 4 and 5 are meshing engaged with each other. In this connection, it should be understood that the first and second bodies of fastener material 4 and 5 have thicknesses combined into a large one after being meshing engaged with each other. However, each of the bodies of fastener material 4 and 5 is relatively thin before they are meshing engaged with each other. Accordingly, only the relatively thin body of fastener material 4 and 5 has to be turned over by the turn over bar 12 or 13. The first and second bodies of fastener material 4 and 5 can therefore be turned over exactly, the advancing direction being exchanged exactly. Furthermore, in the first and second bodies of fastener material 4 and 5, not the engagement portions 4a and 5a but the tapes 4b and 5b are engaged with the turn over bars 12 and 13. The bodies of fastener material 4 and 5 can therefore be turned over smoothly.

In addition, differences in turned over radius and turned over distance must come into being between the first and second bodies of fastener material 4 and 5 if they are turned over with the advancing direction being changed after being meshing engaged with each other. The first and second bodies of fastener material 4 and 5 are therefore moved relatively to each other longitudinally thereof to be disengaged from each other. In contrast, in the apparatus, the first and second bodies of fastener material 4 and 5 are opposed to and meshing engaged with each other after the advancing direction is changed. Accordingly, the first and second bodies of fastener material 4 and 5 are then kept being meshing engaged with each other. They cannot be disengaged from each other.

In the apparatus, the turn over bars 12 and 13 have to be inserted between the first and second webs of panel material 1 and 2. In addition, the first and second bodies of fastener material 4 and 5 have to advance in the first direction to be inserted between the first and second webs of panel material 1 and 2 and advance in the second direction after the advancing direction is changed between the first and second webs of panel material 1 and 2. The first and second webs of panel material 1 and 2 have therefore to be spaced from each other when being fed longitudinally thereof. In this connection, it should be noted that the first and second bodies of fastener material 4 and 5 are disposed in plane with each other when advancing in the first and second directions. The plane is horizontal. The first and second bodies of fastener material 4 and 5 are therefore kept being disposed horizontally when advancing in the first and second directions. The first and second bodies of fastener material 4 and 5 do not rise from the horizontal plane. On the other hand, the webs of panel material 1 and 2 are disposed and fed horizontally. The webs of panel material 1 and 2 have therefore not to be spaced from each other at a distance which is large. Even if the distance is not large, the first and second bodies of fastener material 4 and 5 can be turned over by the turn over bars 12 and 13 with the advancing direction being change between the first and second webs of panel material 1 and 2. The distance can be predetermined to be small so that the first and second webs of panel material 1 and 2 can be fed conveniently. The machine can be compact, not resulting in a problem of space for installing.

The first and second bodies of fastener material 4 and 5 are inserted into the first and second guide grooves 20 and 21 for guidance of the meshing engagement portions 4a and 5a and the tapes 4b and 5b so that the first and second bodies of fastener material 4 and 5 can be opposed to each other exactly after being turned over. In addition, the first and second bodies of fastener material 4 and 5 are inserted into the third guide groove 23 for guidance of the meshing engagement portions 4a and 5a and the tapes 4b and 5b so that the first and second bodies of fastener material 4 and 5 can be meshing engaged with each other exactly.

Figure 3:
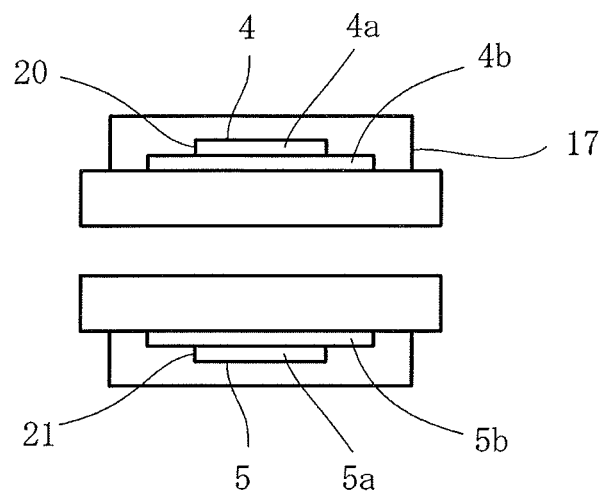
FIG. 3 is a sectional view (A) of another embodiment and a perspective view (B) of another embodiment.
Figure 3:
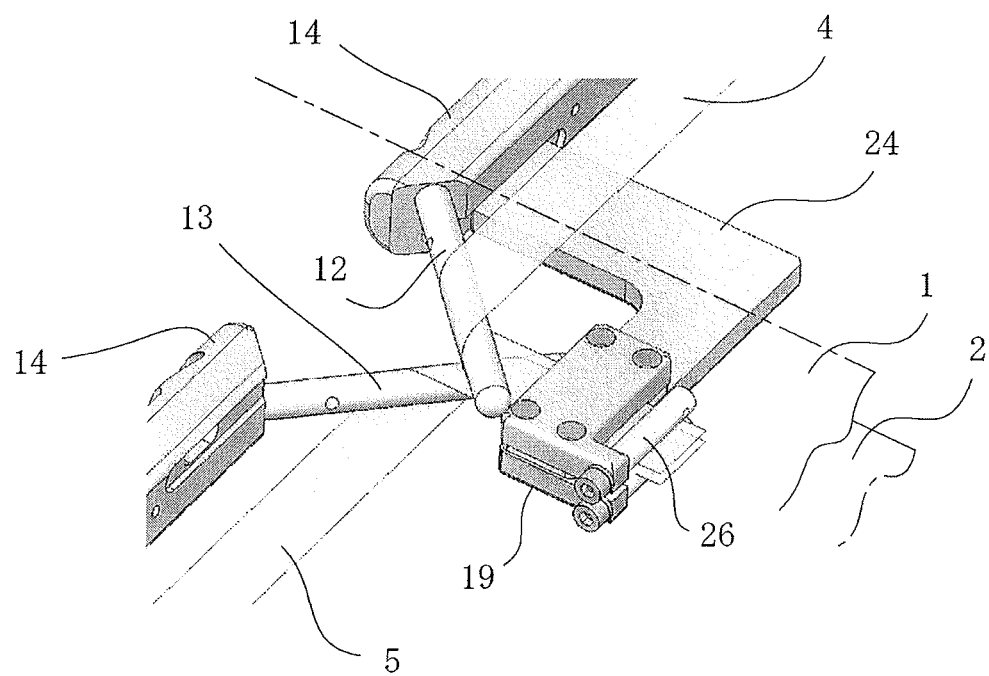

The first guide groove 20 may have a sectional shape corresponding to the meshing engagement portion 4a and the tape 4b of the first body of fastener material 4, as shown in FIG. 3. The second guide groove 21 may have a sectional shape corresponding to the meshing engagement portion 5a and the tape 5b of the second body of fastener material 5. In this case, the first and second bodies of fastener material 4 and 5 can be inserted into the first and second guide grooves 20 and 21 for guidance of the meshing engagement portions 4a and 5a and the tapes 4b and 5b exactly (FIG. 3A).

The turn over bars 12 and 13 are spaced from each other in the third direction normal to the first and second directions and inclined at the predetermined angle with respect to the first direction, as described previously. The first direction is the direction of width of webs of panel material 1 and 2. Under the circumstances, the turn over bars 12 and 13 have not always to be disposed parallel to each other, as described in the embodiment of FIG. 1. The turn over bars 12 and 13 may intersect with each other. In this case, the first and second bodies of fastener material 4 and 5 should advance in the first direction to be directed to the turn over bars 12 and 13 on opposite sides of the turn over bars 12 and 13 (FIG. 3B).

The first and second bodies of fastener material 4 and 5 therefore advance widthwise of the webs of panel material 1 and 2 and reversely to each other. The first and second bodies of fastener material 4 and 5 are then inserted between the first and second webs of panel material 1 and 2 to be directed to and engaged with the turn over bars 12 and 13. In addition, the first and second bodies of fastener material 4 and 5 are inserted between and turned over by the turn over bars 12 and 13 with the advancing direction being changed into the second direction. The second direction is the direction of length of webs of panel material 1 and 2. The first and second bodies of fastener material 4 and 5 then advance in the direction of length of webs of panel material 1 and 2 in the state of being opposed to each other.

The first and second bodies of fastener material 4 and 5 then pass the third guide portion 19 to be inserted between the guide bars 26 so that the first and second bodies of fastener material 4 and 5 should be meshing engaged with each other by the guide bars 26. The turn over bars 12 and 13 are mounted on the bracket 14 while the third guide portion 19 is mounted on the bracket 24, as in the case of the embodiment of FIG. 1.

In the machine of FIG. 1, sheets of side gusset material may be inserted between the first and second webs of panel material 1 and 2, as in the case of the machine of U.S. Pat. No. 7,331,917. The webs of panel material 1 and 2 and the sheets of side gusset material are then heat sealed with each other widthwise of the webs of panel material 1 and 2 by a cross seal device so that the plastic bag should include side gusset portions formed by the sheets of side gusset material. A web of bottom gusset material may be inserted between the first and second webs of panel material 1 and 2 to be disposed longitudinally thereof. The webs of panel material 1 and 2 and the web of bottom gusset material are then heat sealed with each other longitudinally of the webs of panel material 1 and 2 by a longitudinal seal device so that the plastic bag should include a bottom gusset portion formed by the web of bottom gusset material.

What is claimed is:

1. A fastener advancing direction changing apparatus in which first and second bodies of fastener material are fed longitudinally thereof to advance in a first direction which is an advancing direction, the advancing direction being changed into a second direction, the apparatus comprising:
   a pair of turn over bars spaced from each other in a third direction normal to the first and second directions and inclined at a predetermined angle with respect to the first direction; and
   a guide device by which the first and second bodies of fastener material are guided to advance in the first direction to be directed to and engaged with the turn over bars, the first and second bodies of fastener material being then inserted between and turned over by the turn over bars with the advancing direction being changed by the turn over bars from the first direction into the second direction so that the first and second bodies of fastener material come close to each other and then advance in the second direction in a state of being opposed to each other, the first and second bodies of fastener material being disposed parallel with each other and along a plane when advancing in the first and second directions.

2. The apparatus as set forth in claim 1 wherein the turn over bars are inclined at an angle of 45° with respect to the first direction while the second direction is inclined at an angle of 45° with respect to the turn over bars so that the advancing direction should be changed at an angle of 90°.

3. The apparatus as set forth in claim 1 further comprising a meshing engagement device disposed downstream of the turn over bars in the second direction, the first and second bodies of fastener material advancing in the second direction to pass through the meshing engagement device so that the first and second bodies of fastener material should be meshing engaged with each other by the meshing engagement device.

4. The apparatus as set forth in claim 1 wherein the first and second bodies of fastener material are meshing engaged with each other by the turn over bars when being inserted between the turn over bars.

5. The apparatus as set forth in claim 1 wherein the first and second bodies of fastener material include meshing engagement portions formed integrally with tapes, the meshing engagement portions being opposed to each other in the first and second bodies of faster material when advancing in the second direction.

6. The apparatus as set forth in claim 5 wherein the guide device includes first, second and third guide portions, the first and second guide portions being disposed upstream of the turn over bars in the first direction, the first and second guide portions including first and second guide grooves formed therein, the first body of fastener material being inserted into the first guide groove for guidance of the meshing engagement portion and the tape, the second body of fastener being inserted into the second guide groove for guidance of the meshing engagement portion and the tape, the third guide portion being disposed downstream of the turn over bars in the second direction, the third guide portion including a third guide groove formed therein, the first and second bodies of fastener material being inserted into the third guide groove for guidance of the meshing engagement portions and the tapes, the third guide portion further including a pair of plates inserted between the tapes of the first and second bodies of fastener material on opposite sides of the meshing engagement portions when the first and second bodies of fastener material are inserted into the third guide groove.

7. The apparatus as set forth in claim 1 wherein the turn aver bars are disposed parallel to each other, the first and second bodies of fastener material advancing in the first direction to be directed to the turn aver bars on one side of the turn over bars in a state of being opposed to each other.

8. The apparatus as set forth in claim 1 wherein the turn over bars intersect with each other, the first and second bodies of fastener material advancing in the first direction to be directed to the tuna over bars on opposite sides of the turn aver bars.

* * * * *